US005145576A

United States Patent [19]

Lataillade

[11] Patent Number: 5,145,576

[45] Date of Patent: Sep. 8, 1992

[54] DEVICES FOR TREATING HUMAN OR ANIMAL DEJECTIONS BY MEANS OF MICROWAVES

[76] Inventor: Maurice Lataillade, Domaine Bellevue, F- 33370 Tresses, France

[21] Appl. No.: 601,814

[22] PCT Filed: Mar. 9, 1990

[86] PCT No.: PCT/FR90/00161

§ 371 Date: Nov. 2, 1990

§ 102(e) Date: Nov. 2, 1990

[87] PCT Pub. No.: WO90/10760

PCT Pub. Date: Sep. 20, 1990

[30] Foreign Application Priority Data

Mar. 9, 1989 [FR] France ................................ 89 03267

[51] Int. Cl.[5] .......................... B01D 5/00; B01D 53/00

[52] U.S. Cl. .................................... 210/180; 210/182; 210/188; 210/259; 210/295; 210/748; 210/770

[58] Field of Search ............... 210/748, 770, 804, 805, 210/180, 182, 188, 195.1, 259, 295, 806

[56] References Cited

U.S. PATENT DOCUMENTS

| | | | |
|---|---|---|---|
| 3,523,076 | 8/1970 | Goerz, Jr. et al. | 210/748 |
| 3,655,048 | 4/1972 | Pergola | 210/748 |
| 3,831,288 | 8/1974 | Stribling et al. | 210/748 |
| 4,193,869 | 3/1980 | Brucker et al. | 210/705 |
| 4,219,415 | 8/1980 | Nassef et al. | 210/748 |
| 4,631,133 | 12/1986 | Axelrod | 210/739 |
| 5,037,560 | 8/1991 | Gayman | 210/748 |

*Primary Examiner*—Robert A. Dawson
*Assistant Examiner*—Sun Uk Kim
*Attorney, Agent, or Firm*—Roylance, Abrams, Berdo & Goodman

[57] ABSTRACT

A device for treating human and animal dejecta with microwaves includes a duct for conveying dejecta material, a microwave applicator surrounding the duct in an irradiation zone, and a microwave generator coupled to the microwave applicator. A driven transporter screw, provided in the duct upstream of the microwave applicator, moves the dejecta material through the duct. An inlet, coupled to an upstream zone of the duct, feeds dejecta material to be treated into the duct adjacent the screw. A vapor extractor is coupled to duct immediately downstream of the irradiation zone to receive treated dejecta material immediately on leaving the irradiation zone. A condensation vat is connected to the extractor and vented through a chimney having a filter.

13 Claims, 4 Drawing Sheets

DEVICES FOR TREATING HUMAN OR ANIMAL DEJECTIONS BY MEANS OF MICROWAVES

The present invention relates to the treatment of human or animal dejecta and proposes a new microwave treatment technique able to solve the problems of cleansing raised by removal of said dejecta and, more particularly, very substantially reduce the risks of pollution and other harmful effects specific to this type of waste and this in an independent and economic way.

For this, the invention provides a method for the treatment of human and animal dejecta by microwaves, characterized in that it consists in subjecting at least the solid parts of the dejecta to be treated to microwave irradiation under controlled conditions so that at the end of the treatment of said parts they have reached a predetermined degree of desiccation.

According to one embodiment of the method, the dejecta to be treated, namely the solid parts alone or mixed with the liquid parts, are forced to pass through a given space subjected to the microwave irradiation, under flow conditions defined so as to obtain the desired degree of desiccation of the treated materials on leaving the irradiation zone.

Moreover, the water vapour released during microwave treatment is advantageously collected for possible recycling or recovery of the condensation water.

Also advantageously said dried materials are collected and conditioned for discharging them or for subsequent treatment.

In the case where only the solid parts are treated with microwaves, the liquid parts are separated before treatment and subjected to evaporation so as to collect the water for possible recycling or recovery.

The invention also relates to devices for implementing the above method.

Such a method is remarkably efficient and makes it possible to transform, in a closed circuit and so independent process, polluting products or products generating different harmful effects into dry and sterile residues of reduced volume and which can be easily handled for discharging same.

Furthermore, the method makes it possible to recover the waters contained in the dejecta and in particular recycle them into the dejecta collecting system, thus contributing in making the dejecta treatment installation independent, possibly totally so, this substantial advantage of the method of the invention being particularly interesting in its application to the treatment of dejecta on sites having high temporary frequentation which are not generally equipped in particular with the required water facilities, or on sites comprising considerable volumes to be treated and sterilized, such as animal breeding farms or else on board air, land or sea vehicles.

Other characteristics and advantages will be clear from the following description of embodiments of the method of the invention, which description is given solely by way of example with reference to the accompanying drawings in which.

Figure 1:
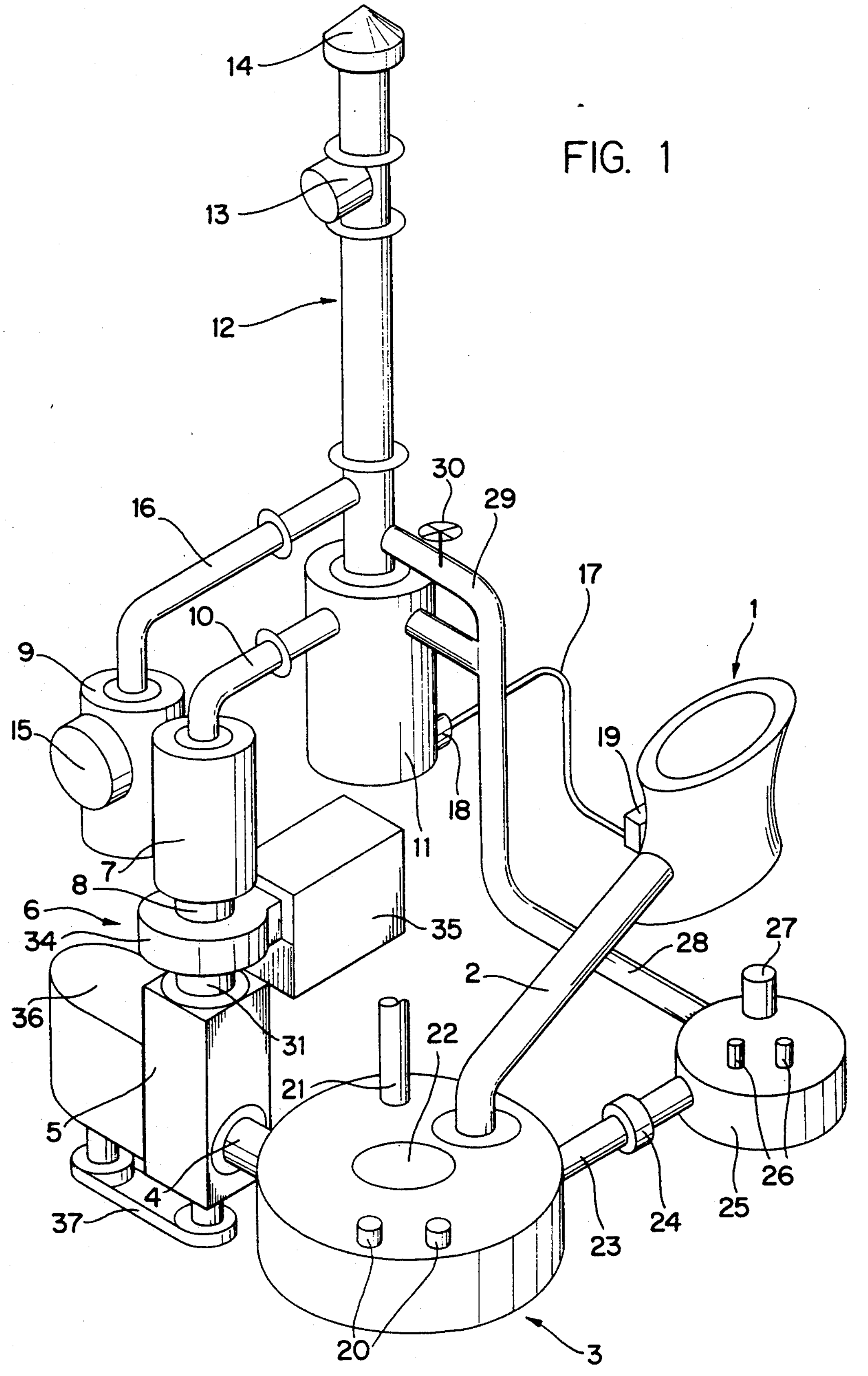
FIG. 1 is a schematic perspective view of a human dejecta treatment installation using the method of the invention.

In FIG. 1, an embodiment of the method of the invention has been shown schematically applied to the treatment of human dejecta collected from a WC pan 1.

Pan 1 is connected by a slightly descending duct 2 to a solid/liquid separation tank 3. Tank 3 is connected by a duct 4 to the lower part of a module 5 for conveying the solid materials from tank 3 upwards towards a microwave irradiation unit 6. Above the irradiation unit 6 is disposed an extractor 7 extracting the gases generated during the microwave treatment.

More precisely, the solid materials from the treatment unit 6 are conveyed through extractor 7 by a duct 8 which extends as far as a tank 9 for recovery of the dried treated materials.

Extractor 7 is formed of an enclosure surrounding duct 8 for recovery of the vapours conveyed in duct 8 and which escape therefrom at the height of extractor 7 through passages formed for this purpose in the wall of said duct 8. The collected vapours are fed by a lagged duct 10 into a vat 11 for condensation of the vapours into water. Condensation takes place at atmospheric pressure, vat 11 being vented through a chimney 12 comprising a filter (not shown), a fan extractor 13 and a ventilation cap 14.

Tank 9 is an enclosure into which the duct 8 emerges after passing through extractor 7. Tank 9 is provided with an access trap 15 for inserting in the tank a bag for collecting the dried materials brought by said duct 8.

The enclosure of tank 9 is connected by a lagged duct 16 to chimney 12.

The duct collects the residual vapours inside tank 9 and discharges them with return of the condensation water towards vat 11.

Vat 11 is further connected by a duct 17, possibly having a filter 18 and a supercharger 19, to pan 1 so as to re-use the condensed water for emptying and cleaning the pan.

Tank 3 is further provided with vents 20, a gas discharge duct 21, an access trap 22 and a duct 23 equipped with a filtering sleeve 24 for feeding the liquid parts from tank 3 towards an evaporation vat 25. This vat, of conventional design, is equipped with plunging electric heating resistances for evaporating the water contained in the water-urine mixture coming from the separation tank 3.

Vat 25 is provided with vents 26, a gas discharge duct 27 and a duct 28 for feeding the vapours into the condensation vat 11. A by-pass 29 with a vapour regulation valve 30 connects duct 28 to chimney 12, upstream of the filter.

Figure 2:
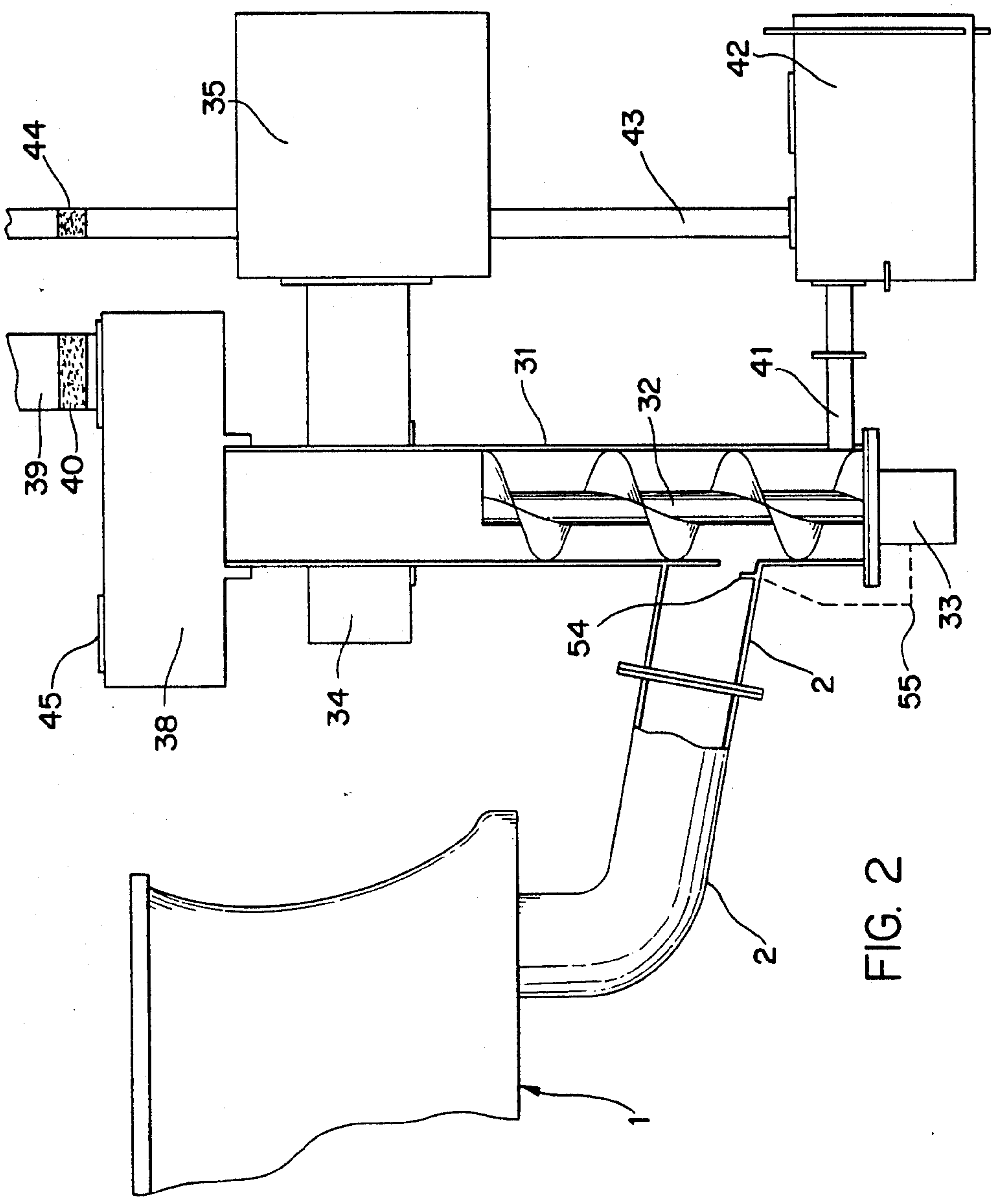
FIG. 2 is a partial vertical sectional view of another embodiment of the method of the invention.

The assembly 5–6 shown in FIG. 1 conforms for example to the device shown schematically in FIG. 2.

In this FIG. 2, at 31 a cylindrical vertical duct has been shown in which an Archimedes screw 32 is disposed driven by a motor driven reducing assembly shown symbolically at 33.

Duct 31 passes through an annular enclosure 34 forming a guide or wave applicator and concentrating the microwaves emitted by a generator 35 on to the materials transiting inside duct 31, whose wall is made from an appropriate material, for example "Teflon", transparent to the microwaves.

The Archimedes screw 32 does not extend as far as the microwave applicator 34.

The installation of FIG. 1 may comprise a treatment unit 6 formed of an applicator 34 and a generator 35 such as shown in FIG. 2 and a module 5 feeding materials to be treated into a duct 31 and comprising a vertical Archimedes screw 32 driven for example by an electric motor 36 via an appropriate transmission 37.

In the embodiment shown in FIG. 2, duct 31, after passing through applicator 34, emerges into a sealed reservoir 38 vented through a duct 39 having a filter 40.

Still with the embodiment of FIG. 2 and contrary to the embodiment of FIG. 1, all the solid and liquid parts of the dejecta fed by gravity by duct 2 from pan 1, is admitted into the module 31–32 conveying the materials towards the microwave treatment zone. However, only the solid materials are taken over by screw 32, the liquid part being discharged at the lower portion of duct 31 through a duct 41 in the direction of an evaporation vat 42 similar to vat 25 of FIG. 1 and having a vapour discharge duct 43 with filter 44.

Operation of the means (5, 31, 32) shown in FIGS. 1 and 2 for conveying solid materials in the direction of the space defined inside duct 31, at the height of the microwave applicator 34, for irradiation of said materials by appropriate microwaves is the following.

Screw 32 continuously pushes the solid materials in duct 31 towards the microwave applicator 34. During its passage through the zone of duct 31 surrounded by applicator 34, the materials undergo microwave irradiation so that, at the output of the irradiated zone, the materials are in the desired desiccated condition. In the present application, it is desirable to have materials as dry as possible so as to reduce the volume of solid waste and facilitate handling or subsequent conditioning thereof.

The microwave generator 35 and its applicator 34 are known devices. As applicator those described in EP-0 252 542 may for example be used or any other system with rectangular or square section forming a treatment cavity, in accordance with the standards in force, in particular concerning microwave leaks. In this connection, microwave leak sensors are provided, on the one hand, close to generator 35 and, on the other hand, in the premises where pan 1 is installed.

The frequency of the microwave generator is for example 2450 MHz or another of the frequencies authorized for industrial, scientific or medical applications. One or more restored power generators of 800 W, 1200 W or several kW are used. Similarly, several applicators 34 may be provided. The same applicator may be connected to several generators, and similarly several generator-applicator assemblies may be placed in parallel and side by side about duct 31.

The power of the microwave generation unit is calculated so that it provides the desired degree of desiccation of the treated materials, the flowrate of the latter through the zone of duct 31 passing through the applicator(s) 34, which is defined and regulated by the rotational speed of screw 32, being also an essential parameter of the microwave treatment.

These different parameters of course depend on the volume of dejecta to be treated.

In the installation of FIG. 1, the dried materials are brought through duct 8 by the thrust exerted by the underlying materials themselves pushed by screw 32, towards extractor 7 collecting the water vapour generated during the treatment of the materials.

Then, the dried materials are pushed into tank 9 where they are bagged in the manner of dust in a vacuum cleaner bag. Thus, the dried materials are enclosed in a sealed bag easy to handle for discharging same or possible subsequent recovery treatment.

In the simplified embodiment of FIG. 2, the dried materials are stored in reservoir 38 and recovered through and inspection trap 45.

Figure 3:
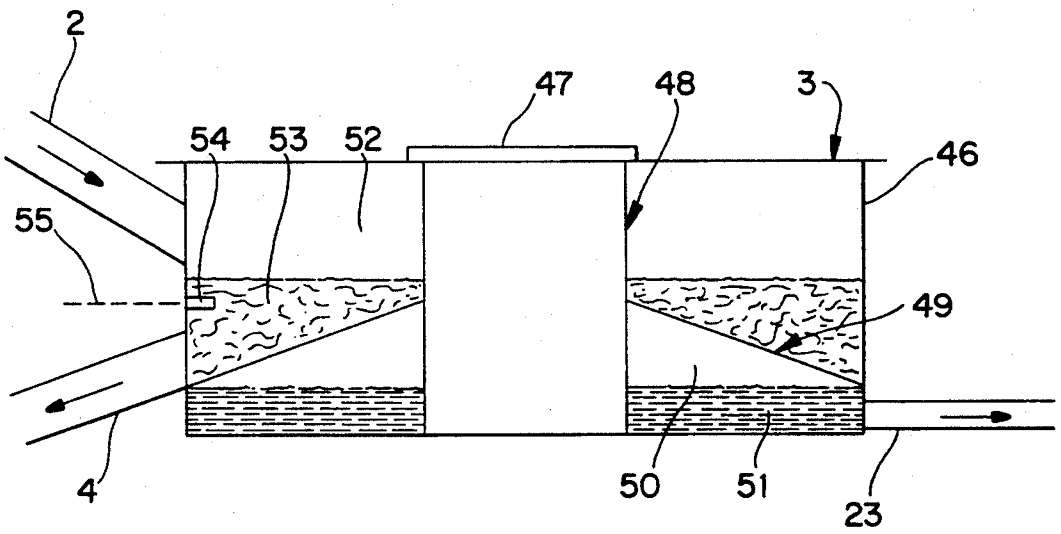
FIG. 3 is a schematic axial vertical sectional view of the module of the installation of FIG. 1 where solid/liquid separation takes place prior to the microwave treatment of the solid materials.

In the installation of FIG. 1, unit 5 only receives the solid materials from tank 3. In FIG. 3, one embodiment of such a tank has been shown schematically.

This tank is formed of a cylindrical enclosure 46, with vertical axis, having at its centre and access trap 47 whose purpose in particular is to position a central cylindrical filter 48. The annular internal space of enclosure 46 is divided into two parts by a truncated cone shaped grid 49 defining a lower space 50 for collecting the liquid part 51 (urine and water) of the dejecta and an upper space 52 for collecting the solid parts.

The dejecta (solid/liquid mixture) are fed into enclosure 46 through a duct (2 in the embodiment of FIG. 1) or through several if the same installation treats the dejecta from several pans 1 connected to the same tank 3.

The liquid part 51 is discharged through duct 23 connected to said evaporation vat 25.

The solid part 53 is directed by duct 4 to the treatment unit 5, 6. It should be noted that the slant of grid 49 tends to push the solid materials 53 by wedge effect outwardly towards the orifice of duct 4.

The evaporation vat 25, whose structure and operation are well known, allows the water to be recovered by condensation of the vapour conveyed by duct 28 in the condensation vat 11.

The water thus recovered is advantageously recycled to pan 1, for example, which allows the installation to operate independently without requiring connection to an external water supply network.

If required, a simple make-up water reservoir (not shown) may be provided in the installation.

Whereas in the embodiment shown in FIG. 1 only the solid materials are fed to the conveying screw 32, in the embodiment of FIG. 2, it is the solid/liquid mixture which is admitted directly through duct 2 into the housing of screw 32.

Removal of the liquid part takes place by gravity at the lower end of duct 31, through duct 41.

Generally, screw 32 is brought into service automatically by means of a material presence sensor disposed close to the output of the duct (4, FIG. 1; 2, FIG. 2) for feeding the materials to be treated into the housing of screw 32, such a sensor being shown symbolically at 54 in FIG. 2 and connected (55) to the motor driven reducing assembly 33 (36, 37) controlling the screw. Such a sensor 54 may be placed in tank 3 (FIG. 3) in an appropriate position.

If only the solid materials are to be fed into the conveying module 5, the liquid materials may be separated before being fed into module 5 by any appropriate means, with recovery and recycling of the water or similar discharge.

It should be noted that such separation is not indispensable, the solid/liquid mixture being possibly treated without separation in unit 6, the microwave generator(s) being adjusted accordingly, the water vapours collected by extractor 7 and complementarily by enclosure 9 being simply in a larger amount. The condensation water is either recovered and recycled, or discharged by any appropriate means.

Figure 4:
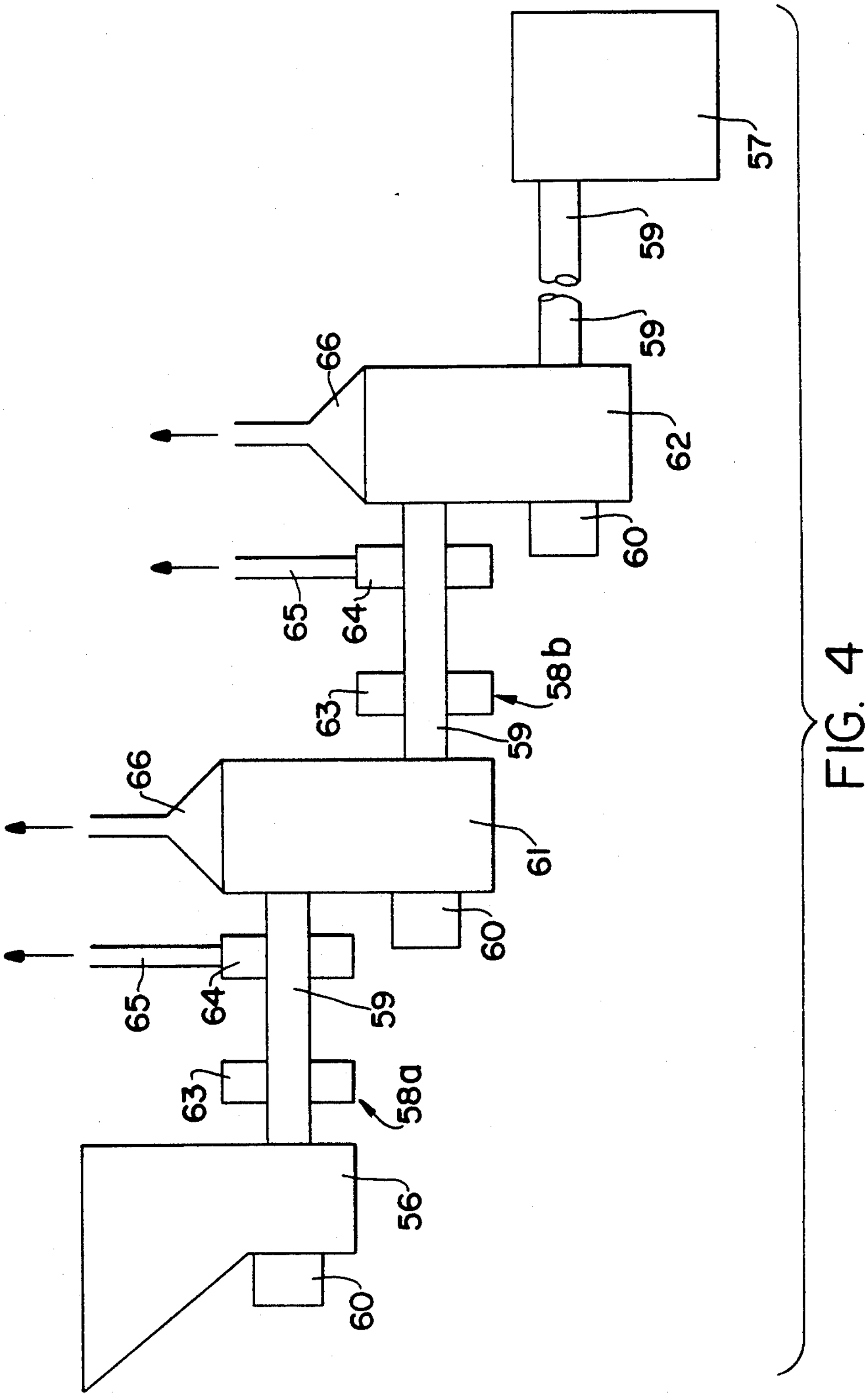
FIG. 4 illustrates schematically an installation according to the invention for the treatment of considerable amounts of dejecta.

In the embodiments of FIGS. 1 and 2, screw 32 is disposed vertically but it could be arranged differently and be, for example, slanted or horizontal. FIG. 4 illustrates a variant of application of the method of the invention to the treatment of large amounts of dejecta and more particularly of animal dejecta.

FIG. 4 shows schematically a cascade treatment installation comprising a hopper 56 for receiving the materials (solids and liquids mixed) to be treated, a hopper 57 for receiving the dried materials after microwave treatments carried out in a plurality of units in series 58*a*, 58*b*, etc. . . . which are variable in number. Each unit 58*a*, 58*b*, etc. . . . comprises at least one horizontal conveying duct 59 with for example an Archimedes screw similar to that of the device of FIG. 2, driven by a motor driven reducer 60. Each duct 59 connects an upstream hopper to a downstream hopper. In FIG. 4 two intermediate hoppers 61 and 62 respectively are shown, besides the two end hoppers 56, 57.

Each duct 59 is equipped with at least one microwave generator-applicator assembly 63 and at least one vapour extractor 64 surrounding duct 59 which is, at this level, formed with perforations or similar in its wall for removal of the vapours.

Extractors 64 are connected by duct 65 to a condensation unit (not shown) for recovery and possible recycling of the water removed from the treated materials.

In the diagram of FIG. 4, each unit 58*a*, 58*b*, etc. . . . comprises a single duct 59, a single generator-applicator assembly 63 and a single extractor 64, but a single duct 59 may be provided and several devices 63 and 64 side by side, or else several ducts 59 each in parallel with one or more devices 63 and one or more devices 64.

The extractor device 64 may be formed for example by a microwave applicator chamber of the type equipping device 63 and whose input, instead of being connected to a microwave generator, is connected to the extraction duct 65, duct 59 of course having perforations or passages in its wall at the height of this application chamber.

Each intermediate hopper 61, 62 comprises, in the top part, a discharge orifice of duct 59 of the upstream treatment unit and, in the bottom part, the conveying screw of the downstream treatment unit.

In addition, each intermediate hopper 61, 62 comprises thereover a collector 66 for extracting the vapours which is also connected to said condensation unit.

The parameters of the treatment units 58*a*, 58*b*, etc. . . . , namely microwave frequency, flowrate of the materials through the duct(s) 59, are adjusted so that the materials discharged into the final hopper 57 have the desired degree of desiccation, the degrees of desiccation of the materials in the intermediate hopper 61, 62 being intermediate between those of the respectively initial and final states of the treated materials.

Such an installation makes it possible to treat considerable amounts of dejecta particularly of animal origin.

The dried materials are loose in the hopper(s) 57 and are removed by any appropriate means for discharge, re-treatment or recycling.

Moreover, without departing from the scope of the invention, any means other than an Archimedes screw may be used for conveying the materials to be treated under the required conditions of controlled flow into the microwave application space, which space may have a different geometric configuration depending on the nature of the conveying means and the morphology of the material conveying duct.

Finally, the solid/gas separation downstream of the microwave treatment may take place in any way other than by vapour extraction and condensation of the water at atmospheric pressure, in the known way, as is the case in the installation of FIG. 1.

I claim:

1. A device for treating human and animal dejecta with microwaves, comprising:

a duct for conveying dejecta material therethrough;

at least one microwave applicator surrounding said duct in an irradiation zone;

at least one microwave generator coupled to said microwave applicator;

transporter screw means, provided in said duct upstream of said microwave applicator, for moving the dejecta material through said duct;

inlet means, coupled to an upstream zone of said duct, for feeding dejecta material to be treated into said duct adjacent said screw means;

drive means, coupled to said screw means, for driving said screw means;

a vapor extractor coupled to said duct immediately downstream of said irradiation zone to receive treated dejecta material immediately on leaving said irradiation zone; and a condensation vat connected to said extractor and vented through a chimney having a filter.

2. A device according to claim 1 wherein said vapor extractor comprises a closed enclosure including an access trap, a gas recovery duct coupled to said condensation vat, and means for collecting and bagging dried materials.

3. A device according to claim 2 wherein circuit means for recovering and recycling condensation water is coupled to said condensation vat.

4. A device according to claim 2 wherein a solid/liquid separation tank is connected to said inlet means for supplying solid dejecta materials thereto; and a liquid circuit is coupled to said separation tank for conveying liquid materials therefrom for downstream processing.

5. A device according to claim 4 wherein said separation tank comprises a cylindrical enclosure with a vertical axis, a central filter, a solid/liquid separation grid having a frustoconical shape coaxial with said vertical axis, at least one liquid discharge orifice located below said grid, at least one solids discharge orifice located above said grid, and at least one supply orifice for introducing solid and liquid materials to be treated above said grid.

6. A device according to claim 5 wherein said liquid circuit comprises an evaporation vat having a water vapor recovery circuit connected to said condensation vat.

7. A device according to claim 4 wherein said liquid circuit comprises an evaporation vat having a water vapor recovery circuit connected to said condensation vat.

8. A device according to claim 1, wherein circuit means for recovering and recycling condensation water is coupled to said condensation vat.

9. A device according to claim 1 wherein a solid/liquid separation tank is connected to said inlet means for supplying solid dejecta materials thereto; and a liquid circuit is coupled to said separation tank for conveying liquid materials therefrom for downstream processing.

10. A device according to claim 9 wherein said separation tank comprises a cylindrical enclosure with a vertical axis, a central filter, a solid/liquid separation grid having a frustoconical shape coaxial with said vertical axis, at least one liquid discharge orifice located below said grid, at least one solids discharge orifice located above said grid, and at least one supply orifice for introducing solid and liquid materials to be treated above said grid.

11. A device according to claim 10 wherein said liquid circuit comprises an evaporation vat having a water vapor recovery circuit connected to said condensation vat.

12. A device according to claim 9 wherein said liquid circuit comprises an evaporation vat having a water vapor recovery circuit connected to said condensation vat.

13. A device for treating human and animal dejecta with microwaves, comprising:

a first hopper for receiving materials to be treated;

a plurality of intermediate units coupled in series downstream of said first hopper, each of said units having an intermediate hopper with a vapor collector, a conveying duct coupling each intermediate hopper to the respective upstream hopper, conveying means in said duct for moving material therethrough at a controlled rate, at least one microwave generator-applicator means coupled to said duct for applying microwaves to materials in a confined space therein, and at least one vapor extractor coupled to said duct; and a second hopper coupled downstream of said intermediate units for receiving dried materials.

* * * * *